No. 817,491. PATENTED APR. 10, 1906.
C. LAUNER.
SASH BALANCE.
APPLICATION FILED OCT. 16, 1905.
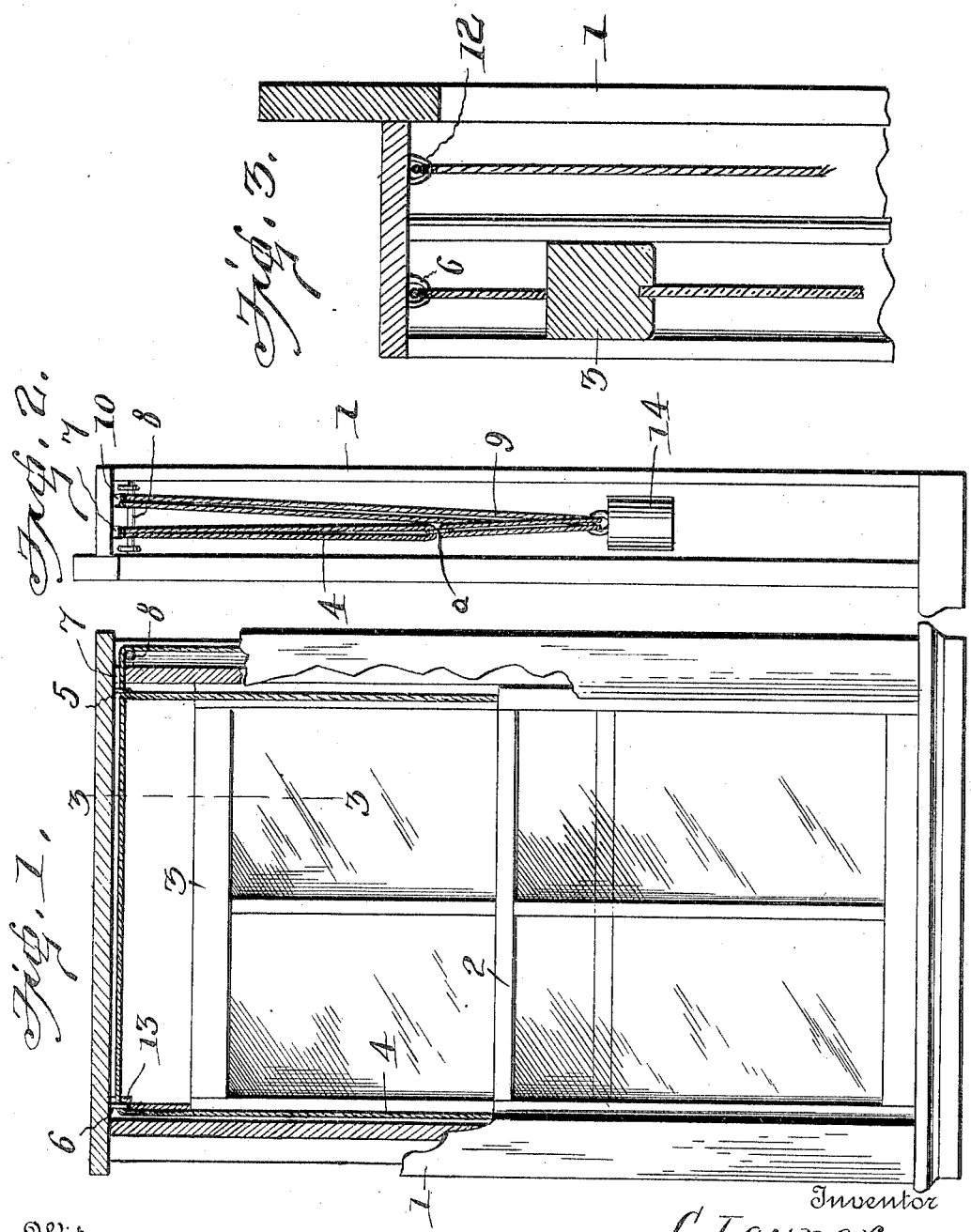
Witnesses
Jos. A. Koehl.
C. H. Griesbauer
Inventor
C. Launer.
by H. B. Willson
Attorney

UNITED STATES PATENT OFFICE.

CHARLES LAUNER, OF FITZGERALD, GEORGIA.

SASH-BALANCE.

No. 817,491. Specification of Letters Patent. Patented April 10, 1906.

Application filed October 16, 1905. Serial No. 282,965.

*To all whom it may concern:*

Be it known that I, CHARLES LAUNER, a citizen of the United States, residing at Fitzgerald, in the county of Irwin and State of Georgia, have invented certain new and useful Improvements in Sash-Balances; and I do declare the following to be a full, clear, and exact description of the invention, such as will enable others skilled in the art to which it appertains to make and use the same.

This invention relates to improvements in sash-balances.

The object of the invention is to provide a balance for window-sashes, whereby but one weight will be required for both sashes and whereby the usual sash-pulleys will be dispensed with.

With the above and other objects in view the invention consists of certain novel features of construction, combination, and arrangement of parts, as will be hereinafter described and claimed.

In the accompanying drawings, Figure 1 is a front elevation, partly in section, of a window-frame, showing the application of the invention. Fig. 2 is a side view of the same, and Fig. 3 is a vertical sectional view on the line 3 3 of Fig. 1.

Referring more particularly to the drawings, 1 denotes the window-frame, 2 denotes the lower sash, and 3 denotes the upper sash.

Connected to each side of the window-sash 2 near the upper end are the ends of a sash-cord 4, one strand of said cord passing up and through a guide-eye 6, arranged adjacent to one side at the top of the window-frame. The loop of the cord 4 is then passed through a guide-eye 5, arranged in the top of the frame adjacent to the opposite side from the guide-eye 6. Said looped end of the cord 4 then passes through an aperture 7, formed in the side of the window-frame and over a wear-plate or roller 8, secured to the outer side of the frame adjacent to said aperture 7. The loop of the cord 4 is connected to the loop of a similar cord 9, which passes through an aperture 10 in the side of the window-frame and through a guide-eye 12, arranged adjacent to the inner side of the frame, after which one end of said cord 9 extends across beneath the top of the window-frame and passes through a guide-eye 13, adjacent to the opposite side of the frame and from thence extends downwardly and is connected to the top edge of the upper sash 3. The opposite end of the cord 9 passes downwardly from the eye 12 and is connected to the opposite edge at the top of the sash 3. The two looped ends of the cords are connected together by a fastening-ring $a$. On the connected looped ends of the cords 4 and 9 is slidably mounted a weight 14, which is sufficiently heavy to balance the lower sash when the same is raised and the upper sash when lowered, thereby retaining one or both of said sashes in their adjusted positions.

By providing a sash-balance constructed and arranged as herein shown and described the usual pulleys and sash-weights are dispensed with, thus saving a considerable expense in the fitting up of a window and providing an efficient and reliable balance for the sashes of the window.

From the foregoing description, taken in connection with the accompanying drawings, the construction and operation of the invention will be readily understood without requiring a more extended explanation.

Having thus described my invention, what I claim as new, and desire to secure by Letters Patent, is—

The herein-described sash-balance, consisting of a cord or rope connected at its ends to the lower sash and provided with a loop intermediate its ends, a window-frame, guide-eyes 5, 6, secured to said window-frame to receive said cord, a cord connected in a like manner to the upper sash, and the looped ends of said cords being connected together, and a weight 14 mounted to slide on the doubled cord of the upper sash, substantially as described.

In testimony whereof I have hereunto set my hand in presence of two subscribing witnesses.

CHARLES LAUNER.

Witnesses:
 ALEXANDER A. HARVEY,
 D. F. THOMPSON.